J. S. & H. A. JOHNSON.
CAR BRAKE.
APPLICATION FILED JUNE 22, 1914.
1,171,050.
Patented Feb. 8, 1916.
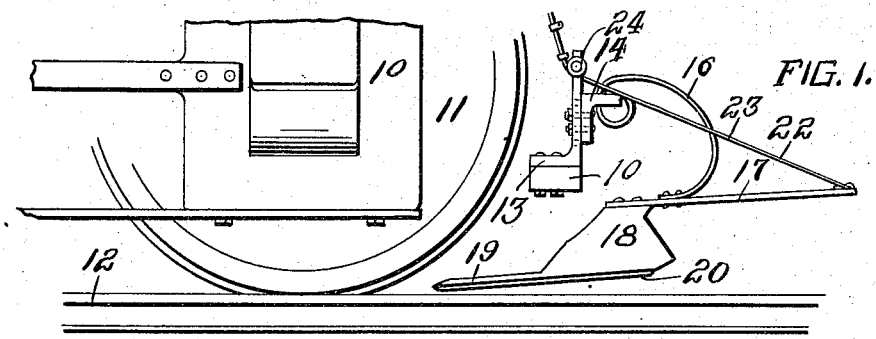
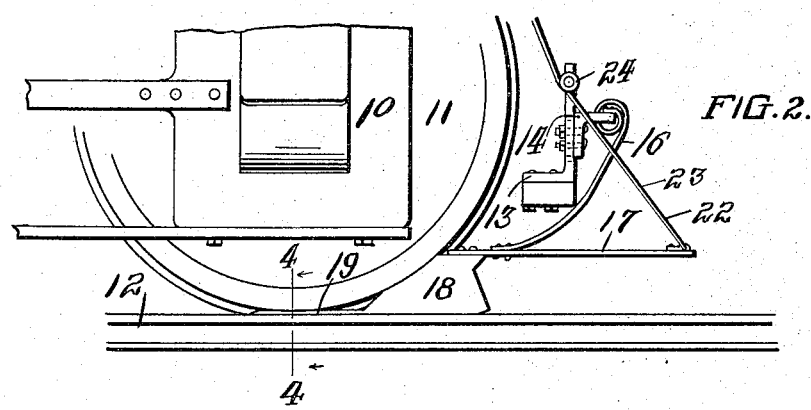
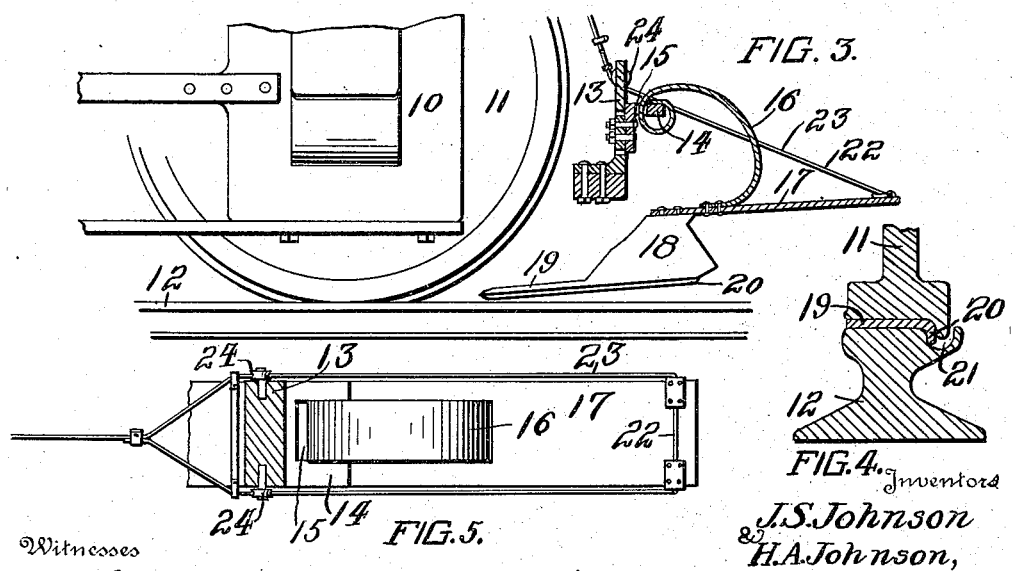
Witnesses
R. T. Williams.
Henry T. Bright.
Inventors
J. S. Johnson
& H. A. Johnson,
By Chandler & Chandler
Attorneys

UNITED STATES PATENT OFFICE.

JOHN S. JOHNSON AND HENRY A. JOHNSON, OF CHICAGO, ILLINOIS.

CAR-BRAKE.

1,171,050.  Specification of Letters Patent.  Patented Feb. 8, 1916.

Application filed June 22, 1914. Serial No. 846,702.

*To all whom it may concern:*

Be it known that we, JOHN S. JOHNSON and HENRY A. JOHNSON, citizens of Sweden, residing at Chicago, in the county of Cook, State of Illinois, have invented certain new and useful Improvements in Car-Brakes; and we do hereby declare the following to be a full, clear, and exact description of the invention, such as will enable others skilled in the art to which it appertains to make and use the same.

This invention relates to car brakes and particularly to those of the emergency type.

The object of the invention is to provide an emergency brake which may be operated upon failure of the usual air brakes to bring the car to an immediate stop.

A further object of the invention resides in the provision of a brake of the character referred to which can be easily associated with an ordinary car structure and which will be efficient in use.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a portion of a car truck with the improved brake applied and showing the latter in its normal or inactive position; Fig. 2, a view similar to Fig. 1 showing the brake applied; Fig. 3, a partial longitudinal section of what is shown in Fig. 1; Fig. 4, a section on the line 4—4 of Fig. 2, and Fig. 5, an enlarged plan view partly in section of the brake device.

Referring to the drawings 10 indicates the car truck, 11 one of the flanged wheels associated therewith and 12 the rail on which the wheel 11 travels. Secured to the truck 10 is an L-shaped bracket 13 to which is secured another L-shaped bracket 14 provided with an opening 15 on one arm thereof. Secured to the arm of the bracket 14 provided with the opening 15 is a leaf spring 16 which is coiled through the opening 15 and has one end thereof suitably connected to a bar 17 intermediate the ends of the latter. The bar 17 is disposed in the plane of the wheel 11 and also in the plane of the rail 12. Depending from the end of the bar 17 adjacent the wheel 11 is a brake shoe or chock block 18 provided with an extension 19 having a depending flange 20 at one side adapted to enter the flange groove 21 of the rail 12 under predetermined conditions. The brake is operated through the medium of a cable 22 provided with a loop 23 engaged over pulleys 24 journaled on the bracket 13, said loop being secured to the end of the bars 17 remote from the shoe 18. The cable 22 is carried to the platform of the car in any suitable manner.

In order to operate the brake it is only necessary to pull upon the cable 22. This will throw the point 19 beneath the wheel 11 when the brake shoe 18 will assume the position shown in Fig. 2 with respect to the wheel 11 and thus block said wheel and stop the car.

What is claimed is:—

In a brake structure, a bracket adapted to be secured to the truck of a car, said bracket having an arm provided with an opening, a bowed leaf spring having one end engaged through said opening and then returned inwardly and secured to the arm, a bar secured to the other end of said spring, a brake shoe carried by said bar and adapted to be engaged between the wheel and rail in advance of the former, and a flexible element secured to the end of the bar remote from the brake shoe adapted when pulled in one direction to move the bar longitudinally against the influence of said leaf spring to engage the brake shoe between the wheel and rail.

In testimony whereof, we affix our signatures in the presence of two witnesses.

JOHN S. JOHNSON.
HENRY A. JOHNSON.

Witnesses:
ANTON G. BJORNER,
DAGNER L. KRISTAFFENOR.

Copies of this patent may be obtained for five cents each, by addressing the "Commissioner of Patents, Washington, D. C."